United States Patent
Lim et al.

(10) Patent No.: US 9,584,494 B2
(45) Date of Patent: Feb. 28, 2017

(54) TERMINAL AND SERVER FOR APPLYING SECURITY POLICY, AND METHOD OF CONTROLLING THE SAME

(71) Applicant: Samsung Electronics Co., Ltd, Gyeonggi-do (KR)

(72) Inventors: Chang-Hyeon Lim, Seoul (KR); Seok-Man Yoo, Suwon-si (KR); Suk-Joon Hwang, Seoul (KR); Young-Kyoo Kim, Seoul (KR); Jong-Seung Baek, Gyeonggi-do (KR); Dong-Ho Jang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 14/188,511

(22) Filed: Feb. 24, 2014

(65) Prior Publication Data
US 2014/0245397 A1    Aug. 28, 2014

(30) Foreign Application Priority Data
Feb. 22, 2013    (KR) .................. 10-2013-0019443

(51) Int. Cl.
*H04L 29/06*    (2006.01)
*G06F 21/60*    (2013.01)
(Continued)

(52) U.S. Cl.
CPC .............. *H04L 63/06* (2013.01); *G06F 21/10* (2013.01); *G06F 21/604* (2013.01);
(Continued)

(58) Field of Classification Search
CPC ....... H04L 63/20; H04L 63/205; H04L 63/10; H04L 63/102; G06F 21/604
See application file for complete search history.

(56) References Cited

U.S. PATENT DOCUMENTS 8,763,159 B1 * 6/2014 Kobets ................ G06F 21/121
  726/31
2007/0004393 A1    1/2007 Forsberg et al.
(Continued)

FOREIGN PATENT DOCUMENTS

EP    1564957 A1    8/2005
KR    10-1191345    10/2012

OTHER PUBLICATIONS

Extended European Search Report dated Jun. 27, 2014 in connection with European Patent Application No. 14156381.7, 6 pages.
(Continued)

*Primary Examiner* — Edward Zee

(57) ABSTRACT

A method of operating a terminal using Mobile Device Management (MDM) solution includes: installing an application, requesting for registration by a license key received from an Enterprise License Management (ELM) server, receiving a Right Object (R/O) that corresponds to the license key and comprises a permission list, setting at least one permission based on the permission list comprised in the received R/O, and performing the set permission. A terminal using MDM comprises an MDM application configured to control an installed application to acquire a required permission, a ELM agent configured to request for registration by a license key from an ELM server, and receive a R/O that corresponds to the license key and comprises a permission list, and an ELM permission enforcer configured to set at least one permission based on the permission list comprised in the received R/O.

14 Claims, 6 Drawing Sheets

(51) Int. Cl.
*G06F 21/10* (2013.01)
*H04W 12/04* (2009.01)
H04W 4/00 (2009.01)
H04W 12/08 (2009.01)

(52) U.S. Cl.
CPC .......... *H04L 63/205* (2013.01); *H04W 12/04* (2013.01); *G06F 2221/0773* (2013.01); *H04L 63/062* (2013.01); *H04L 2463/103* (2013.01); *H04W 4/001* (2013.01); *H04W 4/003* (2013.01); *H04W 12/08* (2013.01)

(56) References Cited

U.S. PATENT DOCUMENTS

2008/0172678 A1* 7/2008 Lee .................. G06F 21/10
    719/315
2012/0185912 A1* 7/2012 Lee .................. H04L 63/10
    726/1
2012/0317621 A1 12/2012 Mihara

OTHER PUBLICATIONS

Dries Vanoverberghe, et al., "A flexible security architecture to support third-party applications on mobile devices", DistriNet Research Group, 2007, 8 pages.

* cited by examiner

TERMINAL AND SERVER FOR APPLYING SECURITY POLICY, AND METHOD OF CONTROLLING THE SAME

CROSS-REFERENCE TO RELATED APPLICATION(S) AND CLAIM OF PRIORITY

The present application is related to and claims the priority under 35 U.S.C. §119(a) to Korean Application Serial No. 10-2013-0019443, which was filed in the Korean Intellectual Property Office on Feb. 22, 2013, the entire content of which is hereby incorporated by reference.

TECHNICAL FIELD

The present disclosure relates to a terminal and a server for applying a security policy, and a method of controlling the same. More particularly, the present disclosure relates to a terminal and a server that can apply a security policy by Mobile Device Management (MDM), and a method of controlling the same.

BACKGROUND

In recent years, smart phones, tablet Personal Computers (PCs), and portable electronic devices have come into wide use, and related technologies have also been developed. Accordingly, workers who are with an enterprise frequently enter and exit places of business while carrying a smart phone or a tablet PC. Due to this, the enterprise establishes various security policies to solve security problems such as leaking of information through the smart phone or the tablet PC, and studies a solution or a service in order to implement the established security policies. A Mobile Device Management (MDM) solution restricts permission of an application stored in a smart phone or a table PC, as a solution for implementation of a security policy.

According to various embodiments, an Android platform may set permission when providing an Application Programming Interface (API) to an application. For example, when a new application is installed, the application may request an API for a camera function or an API for a Bluetooth function from the Android platform.

Meanwhile, an enterprise using the MDM solution may establish a security policy for restricting a specific function, for example, a camera function.

The Android platform uses four protection levels, i.e., a "normal" protection level, a "dangerous" protection level, a "signature" protection level, and a "signatureOrSystem" protection level, when providing an API. In order for an application to acquire permission for usage of a specific API or function in the "signature" protection level, a certificate of an application declaring the permission should coincide with a certificate of an application defining the corresponding permission. When the certificate of the application declaring the permission coincides with the certificate of the application defining the corresponding permission, all permission that the application requests may be automatically granted from the Android platform. The granted permission is preserved until the application is deleted, in which case there is a problem in that the granting method is somewhat static. Namely, it is difficult to flexibly change the granted permission. Accordingly, the granted permission may not be changed even if a contract with a terminal manufacturing company is terminated or a range of the contract is varied after a third party solution acquires all necessary permission.

Further, the MDM solution according to the related art may have the following two security problems when a specific application uses the same signature as a platform.

1. The application signed with a certificate of the platform may have permission equivalent to that of an application previously loaded in a system. Accordingly, restriction on some permission, defined not to be generally used in Android, in addition to APIs for the MDM solution may be fragile.

2. In a case where the corresponding application is recognized as a part of the system and a Shared User Mentifier (UID) is additionally defined, the corresponding application may acquire permission for controlling files of a system area that the system protects from access of a general application or a user.

SUMMARY

To address the above-discussed deficiencies, it is a primary object to provide a terminal and a server that can apply a security policy by a security related application or service such as an MDM solution that can dynamically grant permission, and a method of controlling the same.

In accordance with an aspect of the present disclosure, a method of controlling a terminal by using Mobile Device Management (MDM) is provided. The method includes: installing an application; requesting registration by a license key from an Enterprise License Management (ELM) server; receiving a Right Object (R/O) that corresponds to the license key and includes a permission list; setting permission based on the permission list included in the received R/O; and processing the set permission.

In accordance with another aspect of the present disclosure, a terminal using Mobile Device Management (MDM) is provided. The terminal includes a controller that installs an application, and a communication unit that requests registration by a license key from an Enterprise License Management (ELM) server, and receives a Right Object (R/O) that corresponds to the license key and includes a permission list, wherein the controller sets permission based on the permission list included in the received R/O, and acquires the set permission.

In accordance with another aspect of the present disclosure, a terminal using Mobile Device Management (MDM) is provided. The terminal includes an MDM application that controls an installed application to acquire required permission, an Enterprise License Management (ELM) agent that requests registration by a license key from an ELM server, and receives a Right Object (R/O) that corresponds to the license key and includes a permission list, and an ELM permission enforcer that sets permission based on the permission list included in the received R/O, and acquires the set permission.

In accordance with another aspect of the present disclosure, a method of controlling an Enterprise License Management (ELM) server that provides Mobile Device Management (MDM) is provided. The method includes: receiving a request for transmission of a license key for MDM construction; generating the license key in response to the request, and transmitting the generated license key to an MDM vendor for the MDM construction; receiving an inquiry as to registration by the license key from a terminal using the MDM, and transmitting a Right Object (R/O) to the terminal when it is determined that the license key received from the terminal is valid, wherein the R/O includes a permission list of permissions which the terminal using the MDM may page.

In accordance with another aspect of the present disclosure, a method of controlling a Mobile Device Management (MDM) server that provides MDM is provided. The method includes embedding a license key received from an Enterprise License Management (ELM) server that provides the MDM, establishing and storing a security policy of the MDM, and transmitting at least one of the license key and the security policy to a terminal using the MDM.

As described above, the present disclosure provides a terminal and a server, which can apply a security policy by a security related application or service such as an MDM solution that can dynamically grant permission, and a method of controlling the same. Accordingly, only the API provided to a Software Development Kit (SDK) may be controlled, and all other permissions that a platform does not want to approve may not be granted. Namely, a possibility of granting all the unnecessary permissions is excluded, and therefore a third party using the API may be prevented from performing unintended activities with unnecessary permission of a system level. In addition, in a case where an SDK API provider does not trust the third party, a method for withdrawing the previously granted permission may be supported.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
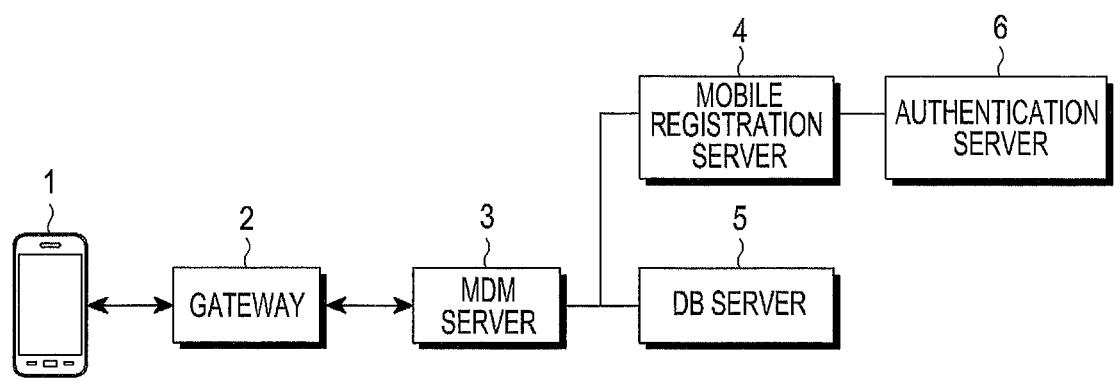
FIG. 1 is a block diagram illustrating a Mobile Device Management (MDM) solution according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged_telecommunication technologies. Hereinafter, various embodiments of the present disclosure will be described more specifically with reference to the accompanying drawings. It should be noted that the same components of the drawings are designated by the same reference numeral anywhere. In the following description of the present disclosure, a detailed description of known functions and configurations incorporated herein will be omitted when it may make the subject matter of the present disclosure rather unclear.

FIG. 1 is a block diagram illustrating a Mobile Device Management (MDM) solution system according to an embodiment of the present disclosure.

Referring to FIG. 1, the MDM solution can include a terminal 1, a gateway 2, an MDM server 3, a mobile registration server 4, a database server 5, and an authentication server 6.

The terminal 1 can download a specific application, and install the downloaded application. In addition, the terminal 1 can be driven based on an Operating system (OS), and can manage an application based on an OS driving method. For example, the terminal 1 can manage the application based on various OS driving methods including Android, iOS, Blackberry, Windows Mobile, Symbian, Bada, and the like. An application can be a general term for programs that can be executed in the various operating systems as described above. The terminal 1 can identify permission related to Application Programming Interface (API) paging that an application requires. Meanwhile, the terminal 1 can restrict some API permissions required by an application from being provided, based on a security policy established by the MDM server. Accordingly, a user of the terminal 1 may not use some functions of the application under the MDM solution, and therefore internal security can be enhanced.

Meanwhile, the terminal 1 does not perpetually use the API permission initially approved by the MDM solution. The terminal 1 can periodically or aperiodically inquire a server of a terminal manufacturing company as to whether a license key is valid, which will be more specifically described below. The terminal 1 can reset the API permission that will be approved, based on a responded Right Object (R/O) according to whether the license key is valid. Accordingly, the permission can be dynamically set.

The terminal 1 can be implemented as a smart phone or a tablet Personal Computer (PC), and a structure of the terminal 1 will be more specifically described below with reference to FIG. 3.

The terminal 1 can perform communication with the gateway 2. The gateway 2 can manage a communication connection between the terminal 1 and the MDM server 3, and can perform a connection through a mobile Virtual Private Network (VPN) and a public mobile communication network. The gateway 2 can perform functions of the communication connection between the terminal 1 and the MDM server 3, authentication, encryption, communication encryption, and user authentication based on a certificate in the mobile VPN (Internet Protocol Security (IPSec) communication encryption). More specifically, the gateway 2 can include a storage module that stores an electronic signature certificate, a mobile VPN policy engine that sets a VPN policy, a VPN driving agent, a mobile VPN driver, and the like.

As an administration service for managing the terminal 1, the MDM server 3 can change environment settings of the terminal and other MDM related systems, or can apply a distribution and a patch of security software. More particularly, the MDM server 3 can store a security policy established by an administrator. The MDM server 3 can control permission contrary to the established security policy. For example, the MDM server 3 can restrict camera related API permission, or can monitor an operation of the terminal 1.

The mobile registration server 4 can perform device registration of the terminal 1. For example, the mobile registration server 4 can perform authentication when receiving a request for registration from the terminal 1.

The database server 5 can store data that the MDM server 3 manages. More particularly, the database server 5 can store status information of the terminal 1 that the MDM server 3 manages. For example, the status information can be an application newly installed in the terminal 1, and permission information that an application requires. The MDM server 3 can control such that API permissions contrary to the security policy are not provided, by using the status information of the terminal 1 which has been read out of the database server 5.

As described above, the terminal 1 may not provide, based on the security policy, some of the API permissions that the application requires. More particularly, the terminal 1 does not maintain the set permission as in the related art, and can flexibly reset permission based on the received R/O, while determining whether the license key is valid.

Figure 2:
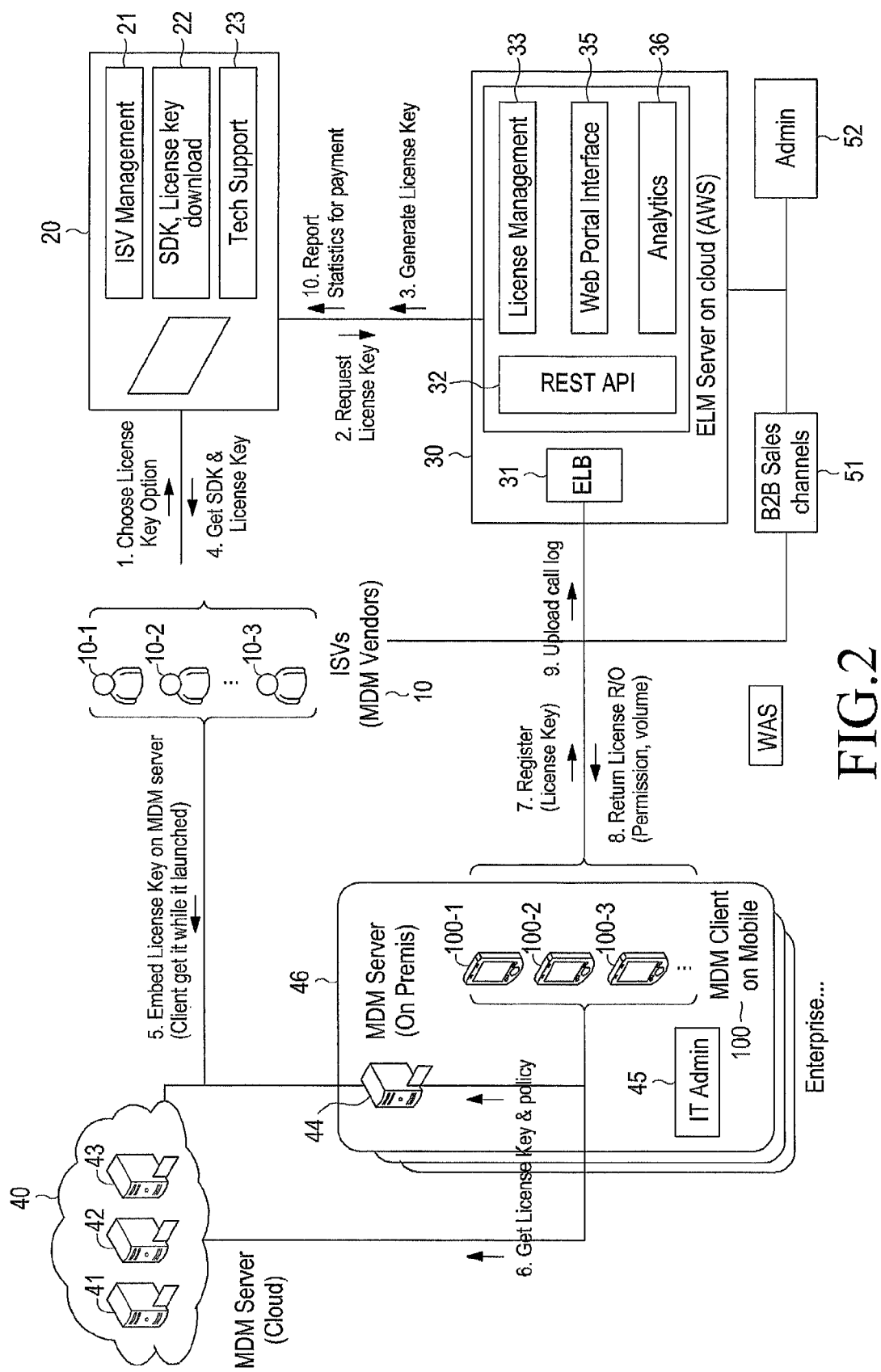
FIG. 2 illustrates an MDM solution according to an embodiment of the present disclosure.

FIG. 2 illustrates an MDM solution according to an embodiment of the present disclosure. The MDM solution can include an MDM vendor, a web portal 20, an Enterprise License Management (ELM) server 30, MDM servers 41 to 44, an enterprise 46, and a terminal 100.

The MDM vendor 10 can provide a service by using an MDM API provided from a manufacturing company of the terminal 100, and can be a third party that constructs the MDM solution for the enterprise 46. The MDM vendor can also be referred to as an Independent Software Vendor (ISV). The MDM vendor 10 can construct the MDM solution based on a Software Development Kit (SDK) provided from the ELM server 30, and can embed the constructed MDM solution in the internal server 44 of the enterprise 46 or the cloud servers 41 to 43 such that the enterprise 46 uses the constructed MDM solution. Operations of the MDM solution will be more specifically described below.

In operation 1, the MDM vendor 10 can select a license key option based on an MDM solution desired to be constructed. The MDM vendor 10 can apply the selected license key option through, for example, various methods such as the web portal 20. The license key option can include at least one of a key for authentication, a key for identification, and required SDK information or permission information. Alternatively, the license key option can also include only a key for authentication or identification.

In operation 2, the web portal 20 may request the license key from the ELM server 30 based on the application received from the MDM vendor 10.

In operation 3, the ELM server 30 can generate the license key based on the received request for the license key. The ELM server 30 can transmit the generated license key to the web portal 20. The license key can include at least one of SDK information or permission information that will be provided to the MDM vendor 10. In addition, the license key can also include information as to whether the MDM vendor 10 is to use the MDM solution.

In operation 4, the web portal 20 can receive the license key, and transmit, to the MDM vendor 10, at least one of the license key and the SDK which have been received.

Meanwhile, the web portal 20 can include an Independent Software Vendor (ISV) management engine 21, an SDK and license key download engine 22, and a technical support engine 23. The ISV management engine 21 can perform communication with the MDM vendor 10. For example, the ISV management engine 21 can receive the license key option from the MDM vendor, and relay the received license key to the MDM vendor 10. The SDK and license key download engine 22 can download the license key from the ELM server. The technical support engine 23 can control an overall operation of the web portal 20.

The ELM server 30 can include an Elastic Load Balancer (ELB) 31, a Representational State Transfer (REST) API 32, license management 33, a web portal interface 35, and analytics 36.

The ELB 31, as an Elastic Load Balancer, can serve to prevent overloads through properly distributing tasks in a plurality of servers within the ELM server.

The REST API 32 is not necessarily a message named "REST" but corresponds to an API, which devices loaded with an external MDM solution can use through a network, as a form for designing a loosely coupled web application depending on a resource to which a name is granted, for example, a resource configured in the form of a Uniform Resource Locator (URL), a Uniform Resource Identifier (URI), or a Uniform Resource Name (URN).

The license management 33 can variously utilize the license keys issued to the respective vendors.

The web portal interface 35 can serve to communicate with the web portal.

The analytics 36 can receive logs of API usage information, or other information from the terminal using the MDM, and variously analyze the same.

An administrator 52 can manage the license of the ELM server, and in addition, can manage the license key through renewal of a contract with the MDM vendor 10 in a B2B (Business to Business) form. For example, when contents of a contract are changed, the administrator 52 can change the license key to reset a permission list which will be included in the R/O.

Hereinafter, operations after the above-described operation 4 of the MDM solution will be described.

In operation 5, the MDM vendor 10 can embed the received license key in the MDM servers 41 to 44. The MDM servers 41 to 43 can be implemented as a cloud server, and the MDM server 44 can be arrange in the enterprise 46. The enterprise 46 can include the MDM server 44, and manage terminals 100-1, 100-2, and 100-3 entering the enterprise 46. The MDM server 44 can store a security policy established by an administrator 45. The security policy can include whether specific permission is approved or not.

Hereinafter, operations after the above-described operation 5 of the MDM solution will be described.

In operation 6, the terminal 100 can receive the license key and the security policy from the MDM server 44 in the enterprise 46 or the cloud servers 41 to 43.

In operation 7, the terminal 100 can inquire the ELM server as to whether the license key is valid, when using the MDM solution or the terminal 100 can periodically inquire the ELM server as to whether the license key is valid. The terminal 100 can request to register the license key in the ELM server.

In operation 8, the ELM server 30 can transmit, to the corresponding terminal 100, a Right Object (R/O) including information on permission that the corresponding terminal 100 can approve.

In operation 9, the terminal 100 can transmit a log using the MDM solution to the ELM server 30.

In operation 10, the ELM server 30 can transfer statistical information on an account to MDM vendors 10-1, 10-2, and 10-3 through various methods.

The terminal 100 can set API permission approved on the basis of the received R/O. Accordingly, when a user controls the terminal 100, some of the API permission can be restricted.

Hereinafter, the terminal will be described with reference to FIG. 3, and operations of the terminal 100 will be described with reference to FIG. 4.

Figure 3:
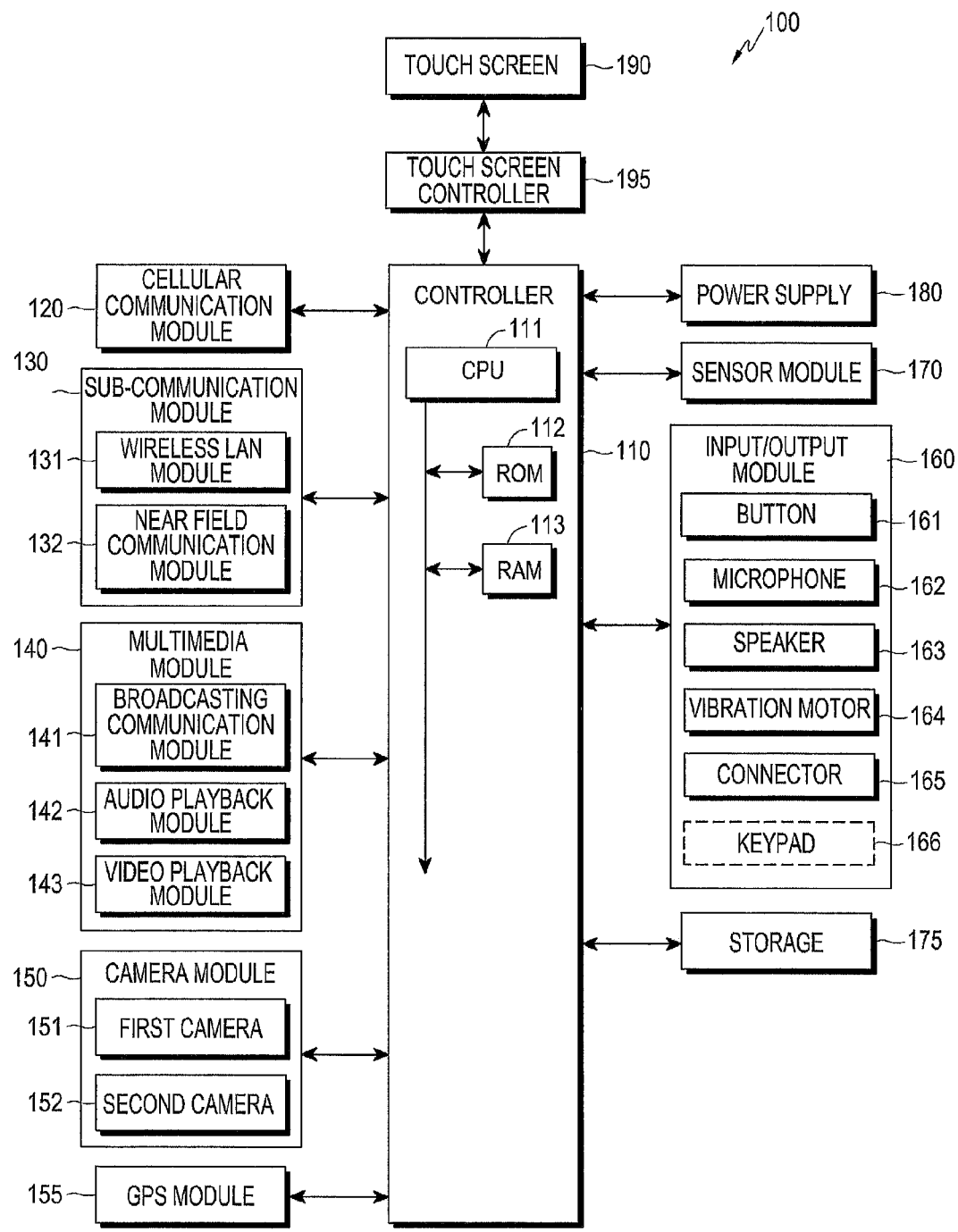
FIG. 3 is a block diagram illustrating a terminal according to an embodiment of the present disclosure.

FIG. 3 is a high level block diagram of a terminal according to an embodiment of the present disclosure.

Referring to FIG. 3, the terminal 100 can be connected with an external apparatus (not illustrated) by using a mobile communication module 120, a sub-communication module 130, and a connector 165. The "external device" can include a different device (not shown), a mobile phone (not shown), a smart phone (not shown), a tablet PC (not shown), and a server (not shown).

The terminal 100 can include a touch screen 190 and a touch screen controller 195. In addition, the terminal 100 can include a controller 110, a mobile communication module 120, a sub-communication module 130, a multimedia module 140, a camera module 150, a GPS module 155, an input/output module 160, a sensor module 170, a storage unit 175, and a power supply unit 180. The sub-communication module 130 includes at least one of a wireless LAN module 131 and a near field communication module 132, and the multimedia module 140 includes at least one of a broadcasting communication module 141, an audio reproducing module 142, and a moving image reproducing module 143. The camera module 150 includes at least one of a first camera 151 and a second camera 152, and the input/output module 160 includes at least one of a button 161, a microphone 162, a speaker 163, a vibration motor 164, a connector 165, and a keypad 166.

The controller 110 can include a CPU 111, a ROM 112 in which control programs for controlling the terminal 100 are stored, and a RAM 113 which stores signals or data input from the outside of the terminal 100 or is used as a memory region for an operation executed in the terminal 100. The CPU 111 can include a single core, a dual core, a triple core, or a quad core. The CPU 111, the ROM 112 and the RAM 113 can be connected with each other through internal buses.

The controller 110 can control the mobile communication module 120, the sub communication module 130, the multimedia module 140, the camera module 150, the GPS module 155, the input/output module 160, the sensor module 170, the storage unit 175, the power supplier 180, a first touch screen 190a, a second touch screen 190b, and the touch screen controller 195.

More particularly, the controller 110 can restrict API permission based on a license key and a security policy received in the mobile communication module 120 or the sub-communication module 130. Further, the controller 110 can control the mobile communication module 120 or the sub-communication module 130 to request registration of the license key. In addition, the controller 110 can reset restriction and approval of the API permission based on an R/O received in the mobile communication module 120 or the sub-communication module 130.

The mobile communication module 120 allows the terminal 100 to be connected with an external apparatus through mobile communication using one or more antennas (not illustrated) according to the control of the controller 110. The mobile communication module 120 can transmit/receive a wireless signal for voice communication, image communication, text message (SMS), or multimedia message (MMS) to/from a portable phone (not illustrated) of which the phone number is input to the terminal 100, a smart phone (not illustrated, a tablet PC, or other apparatuses (not illustrated).

The sub-communication module 130 can include at least one of the wireless LAN module 131 and the near field communication module 132. For example, the sub-communication module 130 can include only the wireless LAN module 131, only the near field communication module 132, or both the wireless LAN module 131 and the near field communication module 132.

Meanwhile, the mobile communication module 120 or the sub-communication module 130 can also be referred to as a communication unit.

The wireless LAN module 131 can be connected to the Internet according to the control of the controller 110 in a place where a wireless AP (Access Point) (not illustrated) is installed. The wireless LAN module 131 supports a wireless LAN standard (IEEE802.11x) of the Institute of Electrical and Electronics Engineers. The near field communication module 132 can perform local area communication wirelessly between the terminal 100 and an image forming apparatus (not illustrated) according to the control of the controller 110. Schemes for the local area communication can include, for example, the Bluetooth scheme, the IrDA (Infrared Data Association) communication scheme, and the Zig-bee scheme.

According to the performance, the terminal 100 can include at least one of the mobile communication module 120, the wireless LAN module 131, and the near field communication module 132. For example, according to the performance, the terminal 100 can include a combination of the mobile communication module 120, the wireless LAN module 131, and the near field communication module 132.

The multimedia module 140 can include the broadcasting communication module 141, the audio reproducing module 142, or the moving image reproducing module 143. The broadcasting communication module 141 can receive a broadcasting signal (e.g., a TV broadcasting signal, a radio broadcasting signal or a data broadcasting signal) which is transmitted from a broadcasting station or broadcasting added information (e.g., EPG (Electric Program Guide) or ESG (Electric Service Guide)) through a broadcasting communication antenna (not illustrated) according to the control of the controller 110. The audio reproducing module 142 can reproduce a stored or received digital audio file (e.g., a file of which the file extension is mp3, wma, ogg, or wav)

according to the control of the controller 110. The moving image reproducing module 143 can reproduce a stored or received digital moving image file (e.g., a file of which the file extension is mpeg, mpg, mp4, avi, mov, or mkv) according to the control of the controller 110. The moving image reproducing module 143 can reproduce a digital audio file.

The multimedia module 140 can include the audio reproduction module 142 and the video reproduction module 143 except for the broadcasting communication module 141. Also, the audio reproducing module 142 or the moving image reproducing module 143 of the multimedia module 140 can be included in the controller 110.

The camera module 150 can include at least one of the first camera 151 and the second camera 152 each of which photographs a still image or a moving image according to the control of the controller 110. In addition, the first camera 151 or the second camera 152 can include an auxiliary light source (e.g. a flash (not illustrated)) that provides an amount of light required for photographing. The first camera 151 can be disposed on the front surface of the terminal 100 and the second camera 152 can be disposed on the rear surface of the terminal 100. In a different way, the first camera 151 and the second camera 152 can be disposed to be adjacent to each other (for example, an interval between the first camera 151 and the second camera 152 is larger than 1 cm or smaller than 8 cm), and thus a three-dimensional still image or a three-dimensional video can be photographed.

The GPS module 155 can receive radio waves from a plurality of Earth-orbiting GPS satellites (not illustrated), and can calculate the position of the terminal 100 using the time of arrival of the radio waves to the terminal 100 from the GPS satellites.

The input/output module 160 can include at least one of a plurality of buttons 161, a microphone 162, a speaker 163, a vibration motor 164, a connector 165, and a keypad 166.

The buttons 161 can be formed on the front surface, side surfaces or rear surface of the housing of the terminal 100 and can include at least one of a power/lock button (not illustrated), a volume button (not illustrated), a menu button, a home button, a back button, and a search button.

The microphone 162 receives an input of voice or sound to produce an electrical signal according to the control of the controller 110.

The speaker 163 can output sounds which respectively correspond to various signals of the mobile communication module 120, the sub-communication module 130, the multimedia module 140, and the camera module 150 (e.g., a radio signal, a broadcasting signal, a digital audio file, a digital moving image file, or photographing) to the outside of the terminal 100 according to the control of the controller 110. The speaker 163 can output a sound which corresponds to the functions performed by the terminal 100 (for example, a button operation sound corresponding to a phone call or a call connection sound). One or more speakers 163 can be formed at a proper position or positions of the housing of the terminal 100.

The vibration motor 164 can convert an electronic signal to mechanical vibration according to the control of the controller 110. For example, when the terminal 100 in a vibration mode receives a voice call from any other apparatus (not illustrated), the vibration motor 164 is operated. One or more vibration motors 164 can be provided in the housing of the terminal 100. The vibration motor 164 can be operated in response to a user's touch action that touches the touch screen 190 and a continuous touch movement on the touch screen 190.

The connector 165 can be used as an interface which interconnects the terminal 100 and an external apparatus (not illustrated) or a power source (not illustrated). The terminal 100 can transmit data stored in the storage unit 175 of the terminal 100 to the external apparatus (not illustrated) or receive data from an external apparatus (not illustrated) through a wired cable connected to the connector 165 according to the control of the controller 110. The user terminal 100 can receive power from a power source (not illustrated) through the wired cable connected to the connector 165 or charge a battery (not illustrated using the power source).

The keypad 166 can receive a key input from the user so as to control the terminal 100. The keypad 166 includes a physical keypad (not illustrated) formed on the terminal 100 or a virtual keypad (not illustrated) displayed on the touch screen 190. The physical keypad (not illustrated) formed on the terminal 100 can be omitted according to the performance or configuration of the terminal 100.

The sensor module 170 can include at least one sensor that detects the status of the terminal 100. For example, the sensor module 170 can include a proximity sensor that detects whether the user approaches to the terminal 100 or not, an illumination sensor (not illustrated) that detects the amount of light around the terminal 100, or a motion sensor (not illustrated) that detects the operation of the terminal 100 (e.g., rotation of the terminal 100, or acceleration or vibration applied to the terminal 100). At least one sensor can detect the state, generate a signal corresponding to the detection, and transmit the generated signal to the controller 110. The sensors of the sensor module 170 can be added or omitted according to the performance of the terminal 100.

The storage unit 175 can store signals or data input/output in response to the operations of the mobile communication module 120, the sub-communication module 130, the multimedia module 140, the camera module 150, the GPS module 155, the input/output module 160, the sensor module 170, and the touch screen 190 according to the control of the controller 110. The storage unit 175 can store control programs and applications for controlling the terminal 100 or the controller 110.

The term, "storage unit" can include the storage unit 175, the ROM 112 and the RAM 113 in the controller 110, or a memory card (not illustrated) (e.g., an SD card or a memory stick) mounted in the terminal 100. The storage unit can include a non-volatile memory, a volatile memory, an HDD (Hard Disc Drive) or an SSD (Solid State Drive).

The power supply unit 180 can supply power to one or more batteries (not illustrated) provided in the housing of the terminal 100 according to the control of the controller 110. The one or more batteries (not illustrated) supply power to the terminal 100. In addition, the power supply unit 180 can supply power input from an external power source (not illustrated) through a wired cable connected to the connector 165 to the terminal 100.

The touch screen 190 can provide a user interface corresponding to various services (for example, phone communication, data transmission, broadcasting, and photographing a picture) to the user. The touch screen 190 can transmit an analog signal corresponding to at least one touch input into the user interface to the touch screen controller 195. The touch screen 190 can receive at least one touch through a body part of the user (for example, fingers including a thumb) or a touchable input means. Also, the touch screen 190 can receive a continuous motion of one touch among at least one touch. The touch screen 190 can transmit an analogue signal corresponding to the continuous movement of the touch input thereto to the touch screen controller 195.

The touch according to the present disclosure is not limited to a touch between the touch screen 190 and the body part of the user or the touchable input means, but can include a non-touch (for example, a case where a detectable interval between the touch screen 190 and the body part of the user or the touchable input means is equal to or smaller than 1 mm). The detectable interval of the touch screen 190 can be changed according to a capability or structure of the portable terminal 100.

The touch screen 190 can be implemented in, for example, a resistive type, a capacitive type, an infrared type, or an acoustic wave type.

The touch screen controller 195 converts the analog signal received by the touch screen 190 to a digital signal (for example, X and Y coordinates) and transmits the digital signal to the controller 110. The controller 110 can control the touch screen 190 by using the digital signal received from the touch screen controller 195. For example, the controller 110 can allow a shortcut execution icon (not shown) displayed on the touch screen 190 to be selected or executed in response to the touch. Further, the touch screen controller 195 can be included in the controller 110

Figure 4:
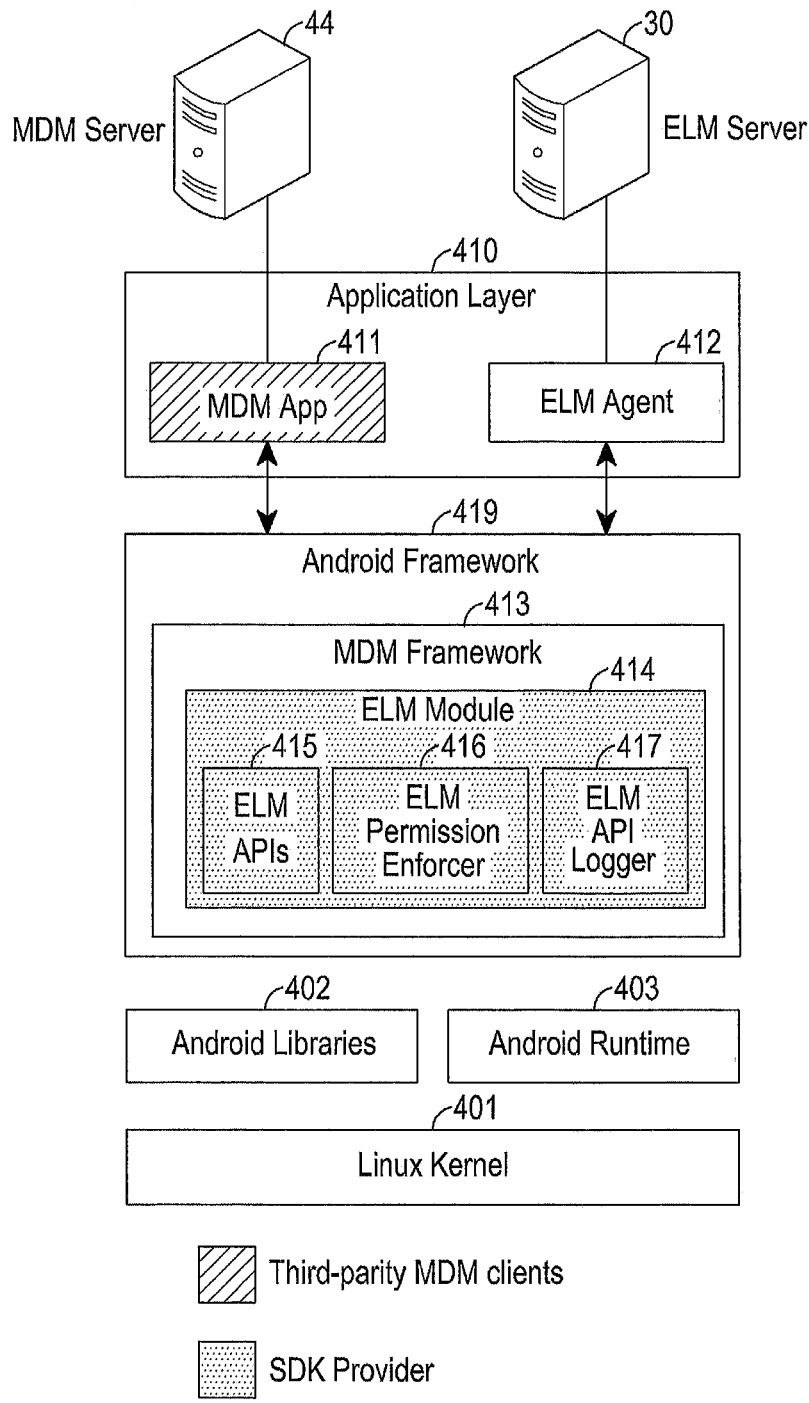
FIG. 4 illustrates a structure of a terminal system according to an embodiment of the present disclosure.

FIG. 4 illustrates a structure of a terminal system according to an embodiment of the present disclosure.

The terminal system structure can include a Linux Kernel 401, Android libraries 402, an Android run time 403, an Android framework 419, and an application layer 410. The terminal system structure can be connected with an MDM server 44 and an ELM server 30. For example, the terminal system structure can be defined in the terminal 100 of FIG. 2.

As illustrated in FIG. 4, the application layer 410 can include a Mobile Device Management (MDM) application 411 and an ELM agent 412. The Android framework 419 can include an MDM framework 413. The MDM framework 413 can include an ELM module 414, and the ELM module can include ELM APIs 415, an ELM permission enforcer 416, and an ELM API logger 417.

The MDM application 411 can perform communication with the MDM server 44. For example, the MDM application 411 can receive at least one of a license key and a security policy from the MDM server 44. For example, the MDM application 411 can be constructed by an MDM vendor (not illustrated) constructing the MDM server 44. The MDM vendor (not illustrated) can control such that the MDM application 411 is installed in the terminal 100 entering the enterprise 46 of FIG. 2. Meanwhile, the ELM agent 412 and the MDM framework 413 can be constructed by the administrator 52 of the ELM server 30.

The MDM application 411 can transfer the received license key to the ELM agent 412 through the ELM framework 413. The ELM agent 412 can transmit the transferred license key to the ELM server 30. More specifically, the ELM agent 412 can inquire the ELM server 30 as to whether the license key is valid.

The ELM server 30 can judge whether the received license key is valid. For example, the ELM server 30 can judge whether a contract with the MDM vendor 10 is valid, or whether the contract has been changed. The ELM server 30 can determine, based on the judged result, whether the license key is valid.

When the license key is valid, the ELM server 30 can register the terminal 100 as a terminal that is valid for usage of the MDM solution. The ELM server 30 can transmit an R/O for user permission to the ELM agent 412 having transmitted the valid license key. The R/O can include a permission list for restriction or approval of the permission.

The ELM agent 412 can output the R/O to the MDM framework 412. The ELM permission enforcer 416 can set permission of the MDM application 411 through analyzing the permission list of the input R/O. The MDM application 411 can accordingly reset the API permission for restriction or approval. The MDM application 411 can reset the API permission for the restriction or the approval through adding API permission for approval or API permission for restriction.

For example, the MDM application 411 can manage an initial permission list as illustrated in Table 1, based on the security policy received from the MDM server 44.

TABLE 1

| API Type | Approval or not |
| --- | --- |
| Camera related API | O |
| Wi-Fi related API | X |
| Data transmission related API | X |
| E-mail account related API | X |

Meanwhile, the R/O received in the ELM agent 142 can include a permission list that restricts the camera related API permission and approves the Wi-Fi related API permission. Accordingly, the MDM application 411 can manage a permission list reset as illustrated in Table 2.

TABLE 2

| API Type | Approval or not |
| --- | --- |
| Camera related API | X |
| Wi-Fi related API | O |
| Data transmission related API | X |
| E-mail account related API | X |

As described above, the terminal 100 according to the related art maintains the initial permission list at it is without resetting the same, when the specific application uses the same signature as a platform. On the other hand, the terminal 100 according to the present disclosure can reset the initial permission list based on the permission list included in the R/O corresponding to the license key. Accordingly, the permission for approval can be dynamically changed as reflected in the license key.

Meanwhile, the ELM API logger 417 can record a log for the paged API.

Figure 5:
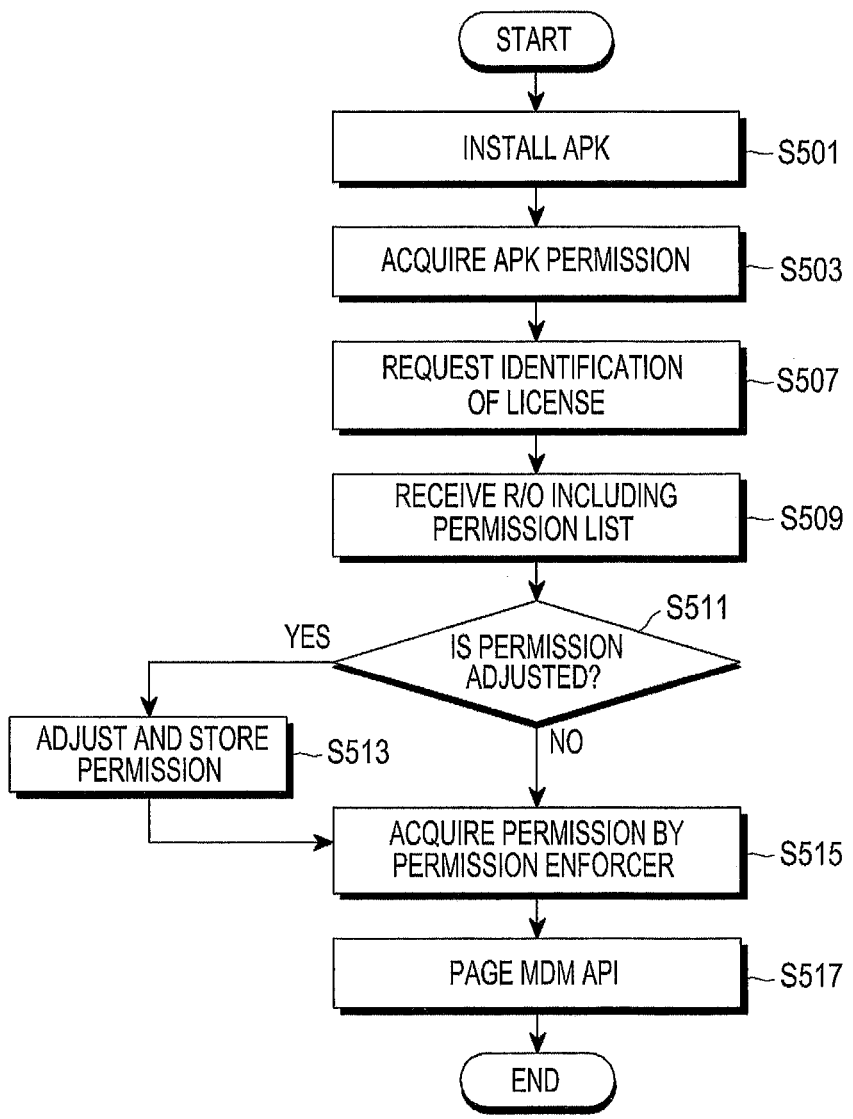
FIG. 5 is a flowchart illustrating a control method of a terminal according to an embodiment of the present disclosure.

FIG. 5 is a flowchart illustrating a control method of a terminal according to an embodiment of the present disclosure. The terminal in FIG. 5 can be a terminal that uses an MDM solution.

In operation S501, the terminal can install an application, for example, an Android package (APK). The application can include an API list paged from an Android platform. In operation S503, the terminal can identify whether the application uses the same signature as the platform, and, when the application uses the same signature as the platform, the terminal can control the application to acquire permission that the application requires.

For example, the terminal can identify a license key and a security policy from an MDM server, and can restrict some permissions based on the security policy.

Meanwhile, in operation S507, the terminal can request an ELM server to identify whether the license key is valid. In operation S509, the terminal can receive an R/O including a permission list from the ELM server.

In operation S511, the terminal can judge whether permission for approval or restriction has been adjusted by the R/O. When it is judged in operation S511 that the permission list included in the R/O has been adjusted differently from initially set permission, the terminal can adjust the permission based on the permission list included in the R/O and store the adjusted permission, in operation S513.

Meanwhile, in operation S515, an ELM permission enforcer of the terminal can control such that permission reset by the adjusted permission is acquired. In operation S517, the terminal can page an MDM API based on the reset permission.

As illustrated above, the terminal can reset the initially set permission based on the R/O.

Figure 6:
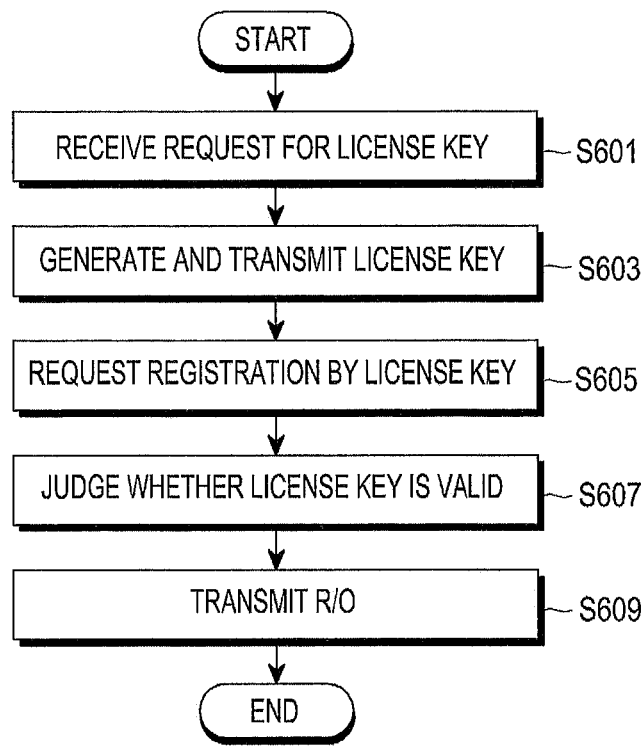
FIG. 6 is a flowchart illustrating a control method of a server according to an embodiment of the present disclosure.

FIG. 6 is a flowchart illustrating a control method of a server according to an embodiment of the present disclosure. The server in FIG. 6 can be a server that provides an MDM solution, and for example, can be a manufacturing company of a terminal. The server can provide an SDK and a license key to an MDM vendor that desires to construct the MDM solution for a specific enterprise.

For example, in operation S601, the server can receive a request for the license key from the MDM vendor. The server can receive the request for the license key directly from the MDM vendor, or can also receive the request through various methods such as relaying a web portal. An administrator of the server can also manage the license key through a contract with the MDM vendor in the B2B form.

In operation S603, the server can generate the license key in response to the request, and transmit the generated license key to the MDM vendor. As described above, the license key can include information on API permission for approval or restriction. Further, the server can also transmit the SDK to the MDM vendor.

Meanwhile, in operation S605, the server can receive a request for registration by the license key from the terminal using the MDM solution. The terminal can receive the license key from an MDM server that the MDM vendor has constructed.

The server can judge, in operation S607, whether the license key is valid, and, in operation S609, generate an R/O to transmit the generated R/O to the terminal. The R/O can include a permission list. The R/O can include the permission list reset differently from an initial permission list.

Figure 7:
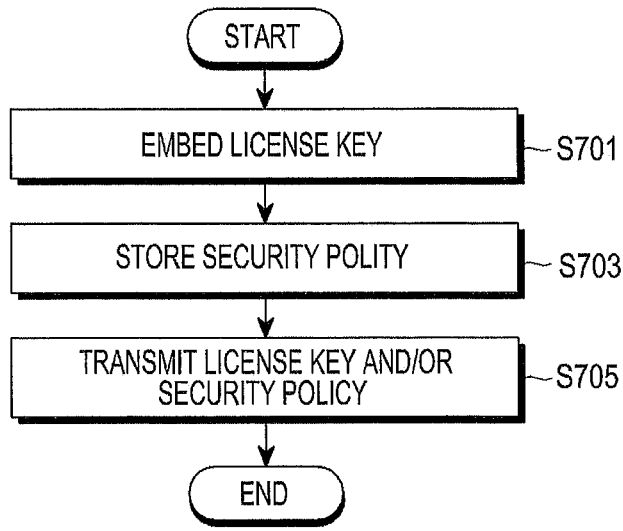
FIG. 7 is a flowchart illustrating a control method of an MDM server according to an embodiment of the present disclosure.

FIG. 7 is a flowchart illustrating a control method of an MDM server according to an embodiment of the present disclosure.

Referring to FIG. 7, in operation S701, the MDM server can embed a license key by an MDM vendor. In addition, in operation S703, the MDM server can store a security policy established by an administrator. Meanwhile, in operation S705, the MDM server can transmit at least one of the embedded license key and the security policy to a terminal using an MDM solution.

While specific embodiments have been described in the detailed descriptions of the present disclosure, it is apparent that various modifications can be carried out without departing from the scope of the present disclosure. Accordingly, the scope of the present disclosure shall not be determined by the above-described embodiments, and is to be determined by not only the following claims but also their equivalents. It can be appreciated that the embodiments of the present disclosure can be implemented in software, hardware, or a combination thereof. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. Also, it will be appreciated that the exemplary embodiments of the present disclosure can be implemented by a computer or a portable terminal which includes a controller and a memory, in which the memory can be an example of a storage medium that is readable by a machine that is suitable for storing one or more programs that include instructions for implementing the exemplary embodiments of the present disclosure. Accordingly, the present disclosure includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection, and the present disclosure properly includes the things equivalent to that.

Further, the device can receive the program from a program providing apparatus connected to the device wirelessly or through a wire and store the received program. The program supply apparatus may include a program that includes instructions to execute the exemplary embodiments of the present disclosure, a memory that stores information or the like required for the exemplary embodiments of the present disclosure, a communication unit that conducts wired or wireless communication with the electronic apparatus, and a controller that transmits a corresponding program to a transmission/reception apparatus in response to the request from the electronic apparatus or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a terminal by using a Mobile Device Management (MDM) solution, the method comprising:
    installing an application;
    receiving a license key and a security policy that is established in an MDM server from the MDM server that is configured to receive the license key from an enterprise license management (ELM) server;
    setting at least one permission of the installed application based on the security policy;
    requesting for registration of the terminal by the license key to the ELM server;
    receiving a Right Object (R/O) that corresponds to the license key and comprises a permission list from the ELM server;
    resetting the at least one permission of the installed application based on the permission list comprised in the received R/O; and
    performing the at least one permission.

2. The method of claim 1, wherein the license key comprises at least one of authentication, identification, or information on permission that the MDM server is configured to approve or restrict.

3. The method of claim 1, further comprising:
    paging an MDM Application Programming Interface (API) based on the set permission.

4. The method of claim 1, further comprising:
receiving, by the ELM server, a request for transmission of the license key for an MDM construction from the MDM server providing the MDM solution;
generating, by the ELM server, the license key in response to the request, and transmitting the generated license key to the MDM server for the MDM construction;
receiving, by the ELM server, a request for registration of the terminal using the MDM solution by the license key from the terminal; and
transmitting, by the ELM server, the R/O corresponding to the license key to the terminal when the license key received from the terminal is valid, the R/O comprising the permission list that the terminal is to page.

5. The method of claim 4, wherein the license key comprises at least one of authentication, identification, or information on permission that the MDM server approves or restricts.

6. The method of claim 1, further comprising:
embedding, by the MDM server, the license key received from the ELM server into the MDM server that provides the MDM solution;
establishing and storing, by the MDM server, a security policy of the MDM solution provided by the MDM server; and
transmitting, by the MDM server, the license key and the security policy to the terminal using the MDM solution.

7. The method of claim 6, wherein the license key comprises at least one of authentication, identification, or information on permission that the MDM server approves or restricts.

8. A terminal using a Mobile Device Management (MDM) solution, comprising:
a communication unit; and
a controller configured to:
install an application;
receive a license key and a security policy that is established in an MDM server from the MDM server that is configured to receive the license key from an enterprise license management (ELM) server through the communication unit;
set at least one permission of the installed application based on the security policy;
request registration of the terminal by the license key to ELM server through the communication unit;
receive a Right Object (R/O) that corresponds to the license key and comprises a permission list from the ELM server through the communication unit; and
reset the at least one permission of the installed application based on the permission list comprised in the received R/O.

9. The terminal of claim 8, wherein the license key comprises at least one of authentication, identification, or information on permission that the MDM server approves or restricts.

10. The terminal of claim 8, wherein the controller is configured to page an MDM Application Programming Interface (API) based on the set permission.

11. A terminal using a Mobile Device Management (MDM) solution, comprising:
an MDM application configured to receive a license key and a security policy that is established in an MDM server from the MDM server that is configured to receive the license key from an enterprise license management (ELM) server and set at least one permission of an application based on the security policy;
an Enterprise License Management (ELM) agent configured to request for registration of the terminal by the license key to the ELM server, and receive a Right Object (R/O) that corresponds to the license key and comprises a permission list from the ELM server; and
an ELM permission enforcer configured to reset the at least one permission of the application based on the permission list comprised in the received R/O.

12. The terminal of claim 11, wherein the license key comprises at least one of authentication, identification, or information on permission that the MDM server approves or restricts.

13. The terminal of claim 11, wherein the MDM application is configured to page an MDM Application Programming Interface (API) based on the set permission.

14. The terminal of claim 11, further comprises:
an ELM API logger configured to record a log of an API including terminal pages.

* * * * *